Oct. 23, 1962

T. J. GOLDAN 3,060,423

PRECISION APPROACH RADAR

Filed Dec. 10, 1956

Inventor
THEODORE J. GOLDAN

By *Percy P. Lantzy*
Attorney

United States Patent Office 3,060,423
Patented Oct. 23, 1962

3,060,423
PRECISION APPROACH RADAR
Theodore J. Goldan, Nutley, N.J., assignor to International Telephone and Telegraph Corporation, Nutley, N.J., a corporation of Maryland
Filed Dec. 10, 1956, Ser. No. 627,433
2 Claims. (Cl. 343—16)

This invention relates to radio object locating systems and more particularly to a precision approach radar system for aircraft landing at an airport.

Radar systems for the control of aircrafts approaching an airport for landing are commonly used at airports. Among the most common of such systems are the ground control approach (GCA) and the improved version of ground control approach systems, precision approach radar (PAR). The information concerning the course of the aircraft is obtained by presenting a picture of the instantaneous position of the aircraft in relation to the approach landing strip by portraying on separate cathode ray tube indicators the azimuth and range and the elevation and range of said aircraft. Two narrow fan beams of radiated energy, one scanning azimuth and the other in elevation, locate the airplane in an area 20 degrees wide in azimuth and up to 6 degrees above the horizon in elevation within a range of 10 miles. These beams are produced by an elevation antenna array and an azimuth antenna array, each consisting of a reflector and a dipole assembly which is fed by a squeezable waveguide. The beam is scanned electrically by varying the width of the waveguide periodically. The squeezable waveguides and other components of ground control approach and precision approach radar are of high precision and accuracy, and expensive to make.

The design objective of the conventional types of precision approach radar has been maximum attainable precision and resolution under all conditions, coupled with high traffic-handling capacity and great flexibility. However, it would appear that much can be done to reduce the cost of landing aid radar if (1) the user is concerned with only a moderate volume of traffic, and can confine all bad-weather landings to a single runway, and (2) maximum precision and resolution is required only within a limited area, and reduced accuracy is acceptable in all other areas. The area of high precision and resolution, would, of course, be that immediately surrounding the approach path.

It is an object of this invention to provide a precision approach radar of inexpensive design and maximum precision within the area immediately surrounding the landing approach path.

It is further an object of this invention to substitute a single non-scanning pulse beam of radiant energy for the two scanning beams of the conventional PAR system.

A feature of this invention is a precision approach radar system having means to transmit signals along an aircraft landing approach path, in a fixed electromagnetic field pattern, the axis of which coincides substantially with said approach path.

Another feature of this invention is the use of an azimuth receiver having fixed directional antennas spaced apart in a first plane, an elevation receiver having fixed directional antennas in a plane orthogonal to said first plane, said azimuth and elevation receivers having indicating means to indicate azimuth and elevation of aircraft approaching the said landing approach path.

The above-mentioned and other features and objects of this invention will become more apparent by reference to the following description taken in conjunction with the accompanying drawings, in which.

Figure 1:
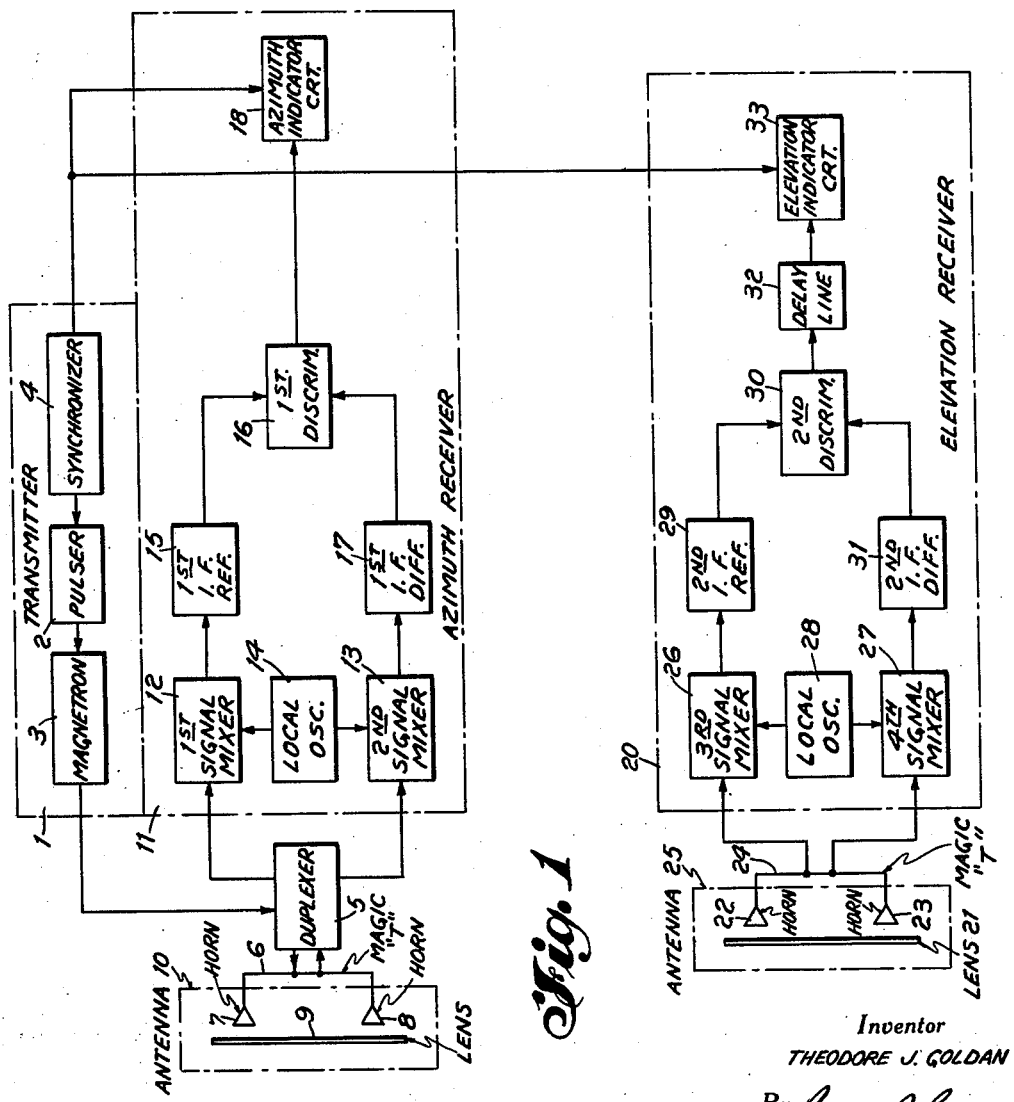
FIG. 1 is a block diagram of an embodiment of this invention.

Referring to FIG. 1, the transmitter 1 consists of a pulser 2 coupled to a magnetron 3 and a synchronizer 4. The magnetron is coupled to a duplexer 5 which is connected to a first magic T 6, to each arm of which is coupled radiating horns 7 and 8. In front of the horns 7 and 8 a focal distance away is a metallic focussing lens 9 to form the radiant energy pulses from the magnetron 3 into a beam of a solid angle of between 5 degrees and 10 degrees surrounding the said approach path. The metallic focussing lens 9 and the horns 7 and 8 which are conventional radiating microwave horns form the antenna system 10 for the transmitter 1 and an azimuth receiver 11. The duplexer 5 is also connected to the azimuth receiver 11 by coupling to a first signal mixer 12 and a second signal mixer 13. A local oscillator 14 is coupled to the signal mixers 12 and 13. A first reference intermediate frequency amplifier 15 couples a first discriminator 16 to the mixer 12 and a first difference intermediate amplifier 17 couples the first discriminator 16 to the mixer 13. The output of the first discriminator 16 is fed to an azimuth indicator 18 of the cathode ray tube type.

The elevation receiver 20 is similarly assembled. The metallic focussing lens 21 is placed a focal distance in front of the radiating horns 22 and 23, which are similar to the horns 7 and 8, and are coupled to a second magic T 24. The metallic focussing lens 21 and the horns 22 and 23 form the antenna system 25 for the elevation receiver 20, and are inclined at an angle determined by the approach path of the aircraft to the runway. The outputs of the magic T 24 are coupled to a third signal mixer 26 and a fourth signal mixer 27. The output of a second local oscillator 28 is coupled to said mixers 26 and 27. A second reference intermediate frequency amplifier 29 is coupled to the third signal mixer 26 and to a second discriminator 30. A second difference intermediate frequency amplifier 31 is coupled to the output of the fourth signal mixer 27 and the second discriminator 30. A delay line 32 couples the second discriminator 30 to an elevation indicator 33 of the cathode ray tube type. The output of the synchronizer 4 is coupled to the azimuth indicator 18 and the elevation indicator 33.

Figure 2:
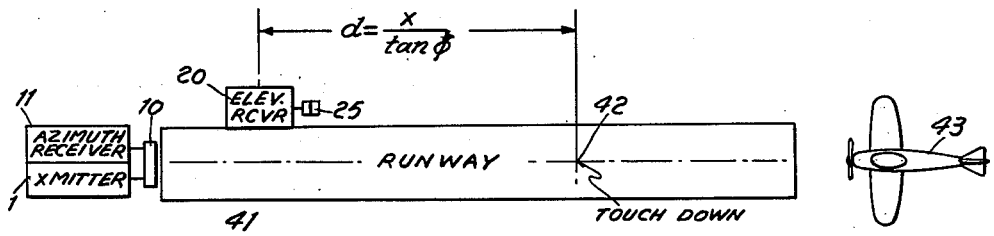
FIG. 2 is a plan view of an airport runway showing the location of the transmitter, azimuth receiver and elevation receiver, and the approach path of an airplane landing on the runway.
Figure 3:
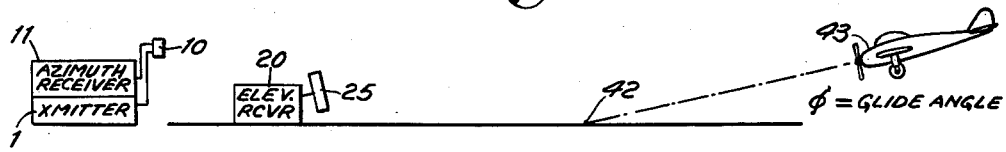
FIG. 3 is an elevation view of the runway showing the location of the transmitter, azimuth receiver, elevation receiver and the approach path of an airplane landing on the runway.

With reference to FIG. 2 the transmitter 1 and the azimuth receiver 11 with antenna system 10 are mounted just beyond the far end of runway 41 and on the extension of the center line of said runway 41. The elevation receiver 20 and the elevation antenna system 25 are mounted at the side of the runway at a distance "d" beyond the point of touch down 42. FIG. 3 shows, in elevation, the approach path of an aircraft 43 coming in to land on the runway 41 and the relative position of the transmitter 1, azimuth receiver 11 and antenna system 10 in one location at the far end of runway 41 and the elevation receiver 20 and antenna system 25 in another location along side the runway 41 at the said distance "d" beyond the point of touch down 42.

Figure 4:
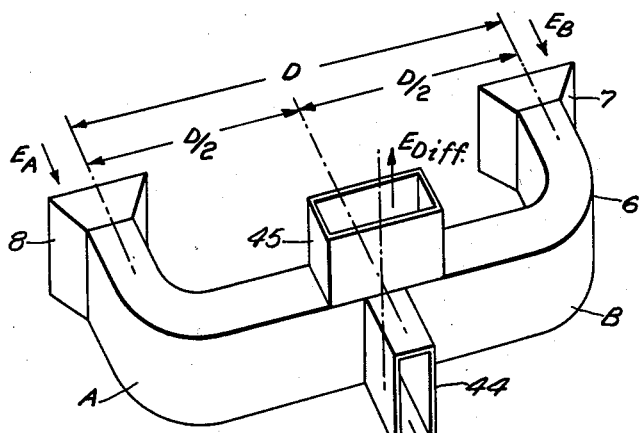
FIG. 4 is an isometric perspective view of the magic T or waveguide hybrid bridge and radiating horns used as an antenna in this invention.

Referring to FIG. 4, horns 7 and 8 are coupled to the two side input arms of the magic T waveguide 6; the two output arms of the magic T 6 are 44 and 45. "D"

is the distance between horns 7 and 8, $E_A$ is the incoming signal of horn 8, $E_B$ is the incoming signal at horn 7, $E_S$ is the output signal at arm 44 and $E_D$ is the output signal at arm 45.

The operation of the two non-scanning direction finding receivers, that is to say the azimuth receiver 11 and the elevation receiver 20, is based upon the properties of the magic T waveguide.

The directional information regarding the position of the approaching aircraft 43 is generated solely by the combination of the two horn antennas 7 and 8, and the magic T 6. The directional information is completely contained in the signals appearing at the sum arm 44 and difference arm 45, and the other direction finding or radar components of the receiver which follow the magic T merely serve to amplify, translate or decipher, and apply this information.

Figure 5:
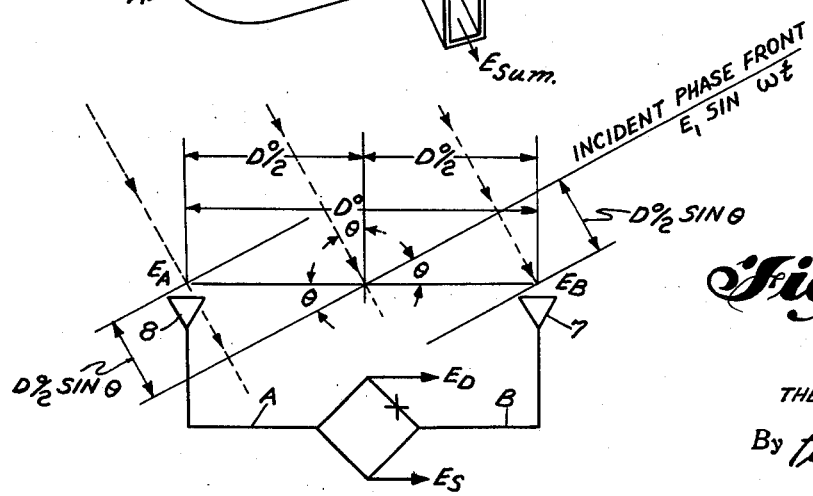
FIG. 5 is a schematic diagram of the magic T and radiating horns.

With reference to FIG. 5, if the incident energy is $$E_1 \sin w_1 t + E_2 \sin w_2 t + \ldots + \ldots \text{etc.}$$

arriving at some angle, $\theta$, from the normal to the base line joining the two horn antennas 7 and 8, the energy at antenna 8 will be leading by the phase angle $D°/2 \sin \theta$, where $D°$ is the electrical separation between the two receiving antennas 7 and 8 feeding the inputs of the magic T 6 and is expressed in electrical degrees for each frequency component. Similarly, the energy at antenna 7 will be lagging by the same phase angle $D°/2 \sin \theta$. For convenience, let $D°/2 \sin \theta = \alpha$. Accordingly, $$E_A = E_1 \sin(w_1 t + \alpha_1) + E_2 \sin(w_2 t + \alpha_2)$$
$$+ \ldots + \ldots \text{etc.}$$

and $$E_B = E_1 \sin(w_1 t - \alpha_1) + E_2 \sin(w_2 t - \alpha_2)$$
$$+ \ldots + \ldots \text{etc.}$$

Assuming equal length A and B arms, in addition to other necessary critical adjustments in the magic T, the signals appearing at the difference arm 45 and sum arm 44 will be $$E_D = E_A - E_B = E_1 \sin(w_1 t + \alpha_1) - \sin(w_1 t - \alpha_1)$$
$$+ E_2 \sin(w_2 t + \alpha_2) - \sin(w_2 t - \alpha_2) \text{ etc.}$$
$$E_S = -E_A + E_B = E_1 \sin(w_1 t + \alpha_1) + \sin(w_1 t - \alpha_1)$$
$$+ E_2 \sin(w_2 t + \alpha_2) + \sin(w_2 t - \alpha_2) \text{ etc.}$$

but $$\sin A - \sin B = 2 \cos \tfrac{1}{2}(A+B) \sin \tfrac{1}{2}(A-B)$$

and $$\sin A + \sin B = 2 \sin \tfrac{1}{2}(A+B) \cos \tfrac{1}{2}(A-B)$$

therefore $E_D$ and $E_S$ can be reduced to $$E_D = 2E_1 \cos w_1 t \sin \alpha_1 + 2E_2 \cos w_2 t \sin \alpha_2$$
$$+ \ldots + \ldots \text{etc.}$$
$$E_S = 2E_1 \sin w_1 t \cos \alpha_1 + 2E_2 \sin w_2 t \cos \alpha_2$$
$$+ \ldots + \ldots \text{etc.}$$

It is evident that all frequency components of the incident energy will produce similar terms in the $E_D$ and $E_S$ expressions; therefore, any one frequency component is representative of all components present. If it is assumed that $D°$ varies negligibly with frequency within the operating bandwidth, as would certainly be true for even a 10-mc. bandwidth at 9 kmc., it is permissible to eliminate all but one representative component from the $E_D$ and $E_S$ expressions in order to simplify the analysis. Therefore, $$E_D = 2E_0 \cos wt \sin \alpha = 2E_0 \cos wt \sin(D°/2 \sin \theta)$$
$$E_S = 2E_0 \sin wt \cos \alpha = 2E_0 \sin wt \cos(D°/2 \sin \theta)$$

where $E_0$ = amplitude coefficient of incident energy.

Both expressions contain identical amplitude terms, related to the amplitude of the incident energy, hence it should be possible to apply these voltages to a discriminator circuit wherein the two amplitude terms would cancel each other, thereby providing an output signal which would be independent of the amplitude of the received signal, above the threshold noise level.

Both expressions contain frequency terms which are also identical except that they are in phase quadrature. However, the phase angle of the difference signal shifts 180° at $\theta$, hence the discriminator 16 provides an output signal which changes its polarity at $\theta = 0$, thereby giving a left, right, or "sense" indication.

The only remaining terms in the two expressions are the direction terms $f(\theta)$. It is clear that within the limits previously imposed upon $D°$ (namely, that $D°$ varies negligibly with frequency), and assuming stable electronic circuitry, the variable $\theta$ (angle of arrival) is the only variable contributing to the amplitude of the final output signal.

The non-ambiguous range of angular coverage, which is the range of operation of this invention, may be deduced from $E_S = 2E_0 \sin wt \cos(D°/2 \sin \theta)$, and falls within the positive and negative values of $\theta$ for which $$\cos(D°/2 \sin \theta) = 0$$
$$D°/2 \sin \theta = \pm 90°$$
$$\sin \theta = \frac{\pm 180°}{D°}$$

however, $$D° = \frac{D \text{ (cm.)} \times 360°}{\lambda \text{ (cm.)}}$$

substituting, $$\sin \theta = \pm \frac{\lambda \text{ (cm.)}}{2D \text{ (cm.)}}$$

$$\theta = \pm \sin^{-1} \frac{\lambda \text{ (cm.)}}{2D \text{ (cm.)}}$$

However, within the non-ambiguous range of $\theta$, the phase angle of $E_S$ is constant while its amplitude varies from a maximum at $\theta = 0$, to zero at plus or minus maximum permissable $\theta$ (for which $\alpha = D°/2 \sin \theta = \pm 90°$). Meanwhile, $E_D$ resembles the usual discriminator curve, in that its phase angle abruptly shifts 180° at $\theta = 0$, coinciding with zero amplitude. The amplitude of $E_D$ increases rapidly either side of $\theta = 0$, later increasing more slowly and finally reaching a maximum at plus or minus maximum permissible $\theta$ (for which $\alpha = \pm 90°$).

Because of its constant phase angle, and the fact that its amplitude remains relatively high throughout most of the useful arc of coverage, the sum channel is also known as the "reference" channel. The difference channel, on the other hand, is known as the "error" channel.

If these R.F. voltages, $E_S$ and $E_D$, are now introduced into signal mixers 12 and 13, and there combined with the output of the local oscillator 14, which may be a klystron, it is apparent that the resulting beat frequencies, or intermediate frequencies ($IF_S$ and $IF_D$) will contain the same phase and amplitude intelligence as the original signal voltages $E_S$ and $E_D$.

It is now only necessary to amplify these IF voltages, with due care for phase shift, and then to feed both IF voltages to the discriminator 16. The discriminator 16 output would be bi-polar video, of one polarity if $E_D$ leads $E_S$ and of opposite polarity if $E_D$ lags $E_S$, hence providing the left-right information, or "sense." The coefficient $E_0$, present in both channels, would cancel out. The remaining amplitude ratio $E_D/E_S$ would be a function of the angular displacement of the target from $\theta = 0$.

The amplitude ratio $E_D/E_S$ may be expressed as $\tan \alpha$. As the tan function exhibits minimum rate of change in the vicinity of 0°, and maximum rate of change in the vicinity of $\pm 90°$, the resulting operation would produce poor resolution in the immediate vicinity of the said approach path with better resolution as deviation increases. This type of operation is the exact opposite of the desired operation. However, there is a way of overcoming this difficulty, and a specific value for D° will be assumed in order to illustrate.

Operation free of ambiguities is obtainable within the arc having limiting values of cos α=0, or α=±90°. If D°=2000°, D°/2=1000°, and the expression α=±90° then reduces to θ=±5.2°. If the bi-polar video amplifier following the $E_D/E_S$ discriminator is designed to limit the tan output function at a level corresponding to α=26°, the limited output will then be essentially linear in the range θ=±1.5°. Course deviations greater than 1.5° will produce only a slight increase in output amplitude.

The theory of operation of the azimuth receiver 11 as described above is equally applicable to the elevation receiver 20.

As stated before, the transmitter 1 and the transmitting and azimuth receiving antenna system 10 along with the azimuth receiver, would be mounted just beyond the far end of the runway from the approach end and on the extension of the runway center line. The elevation receiver 20 and its receiving antenna system 25 would be mounted just off the runway, at the distance "d" beyond the point of touch down 42, with $$d = \frac{x}{\tan \phi}$$

φ being the glide angle employed and x being the difference between the taxiing height of a typical aircraft fuselage and the height of the receiving antenna's axis. For example, if φ is 2° and x is 14 feet, then d=400 feet. The lateral separation between the azimuth receiver 11 and the elevation receiver 20 will introduce a time discrepancy on the order of a few microseconds between the two respective video signals emanating from a beam target as seen on the azimuth indicator 18 and the elevation indicator 33. The introduction of a suitable positive time delay 32 into the elevation video channel will compensate for the above mentioned time discrepancy. The synchronizer 4 develops an electrical signal, a trigger, which goes into the pulser 2, the azimuth indicator 18 and elevation indicator 33 at the same instant. This synchronizer trigger pulse synchronizes the beam appearing on the face of the cathode ray tube indicators in said azimuth indicator 18 and said elevation indicator 33, with the transmitted signal generated by transmitter 1.

The resulting coverage, resolution and accuracy are compatible with the requirements of a simplifier PAR. First, with regard to coverage. For an azimuth guidance equipment placed at the far end of a 5000 foot runway, the coverage arc of 10.4° subtends a chord 900 feet wide at the approach end of the runway. At a distance of ten statute miles from the approach end, the subtended chord is approximately two miles wide.

Regarding resolution and accuracy: for the same azimuth guidance equipment, the arc of ±1.5°, within which no limiting occurs, subtends a chord of 260 feet at 5000 feet, 130 feet on each side of the runway center line. Remembering that pulse polarity establishes left-right sense, then each increment of pulse amplitude equal to one-fifth of the limiting value of deflection is the equivalent of 26 feet. Such increments would be readily discernible, particularly against a calibrated scale. In fact, much finer resolution may be obtained. However, this is to be compared with the published data on the PAR system now used, namely, azimuth resolution and accuracy of ±25 feet at a distance of 4500 feet from the vehicle.

As the elevation guidance equipment would be located about 1000 feet from the approach end of the runway, the corresponding resolution and accuracy on a target just reaching the approach end of the runway would be one-fifth that mentioned for the azimuth guidance, or five foot increments. This compares with the published PAR elevation resolution ±10 feet at a distance of 4500 feet from the vehicle.

While I have described above the principles of my invention in connection with specific apparatus, it is to be clearly understood that this description is made only by way of example and not as a limitation to the scope of my invention as set forth in the objects thereof and in the accompanying claims.

I claim:

1. In a precision approach radar system having means to transmit signals along an aircraft approach landing path, a first antenna array disposed in a first plane, a second antenna array disposed in a second plane orthogonal to said first plane, said antenna arrays being adapted to receive the reflections of said transmitted signals from an aircraft following said landing path, each of said first and second antenna arrays including first and second horn antennas, a focussing lens disposed a focal length in front of said first and second antennas, first and second magic T waveguides coupled to said first and second antenna arrays, means coupling said first and second antennas to the input arms of the related magic T waveguide whereby there is produced as the outputs of said magic T waveguide the sum signal and the difference signal of said reflected signals received at said first and second antennas, said sum and difference signals containing the phase difference information between said signals received at said first and second antennas, first and second receivers, means coupling said sum and difference signals of said first magic T waveguide to said first receiver, means coupling the sum and difference signals of said second magic T waveguide to said second receiver, a first indicator coupled to the output of said first receiver and said transmitting means to indicate azimuth of said aircraft, a second indicator coupled to the output of said second receiver and said transmitter to indicate elevation of said aircraft.

2. In a precision approach radar system having means to transmit signals along an aircraft landing approach path, a first antenna array disposed in a first plane, a second antenna array disposed in a second plane orthogonal to said first plane, each of said first and second antenna arrays including first and second antennas spaced apart and having electromagnetic field patterns the longitudinal axes of which coincide substantially with said approach path and adapted to receive reflections of said transmitted signals from an aircraft following said landing path, means coupled to said first and second antennas to derive the sum signal and the difference signal to said reflected signals received at said first and second antennas and means responsive to said sum signal and said difference signal to derive the phase difference between said reflected signals received at said first and second antennas, means to derive from said phase difference signals of said first and second antenna arrays the azimuth and elevation of said aircraft, and said first and second antenna arrays further include a focussing lens disposed a focal length in front of said antennas.

References Cited in the file of this patent

UNITED STATES PATENTS

| | | |
|---|---|---|
| 2,083,242 | Runge | June 8, 1937 |
| 2,451,822 | Guanella | Oct. 19, 1948 |
| 2,608,683 | Blewett | Aug. 26, 1952 |
| 2,631,279 | Bollinger | Mar. 10, 1953 |
| 2,638,588 | Riblet | May 12, 1953 |
| 2,751,586 | Riblet | June 19, 1956 |
| 2,759,154 | Smith | Aug. 14, 1956 |
| 2,855,592 | Busignies | Oct. 7, 1958 |

FOREIGN PATENTS

| | | |
|---|---|---|
| 712,019 | Great Britain | July 14, 1954 |

OTHER REFERENCES

"Approach Radar," Electronics, October 1955, pp. 155 to 159.